US008364899B2

(12) United States Patent
Ambroladze et al.

(10) Patent No.: US 8,364,899 B2
(45) Date of Patent: Jan. 29, 2013

(54) USER-CONTROLLED TARGETED CACHE PURGE

(75) Inventors: Ekaterina M. Ambroladze, Fishkill, NY (US); Patrick J. Meaney, Poughkeepsie, NY (US); Arthur J. O'Neill, Jr., Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 12/822,428

(22) Filed: Jun. 24, 2010

(65) Prior Publication Data

US 2011/0320732 A1    Dec. 29, 2011

(51) Int. Cl.
*G06F 12/12* (2006.01)
*G06F 13/00* (2006.01)

(52) U.S. Cl. ........................................ 711/135; 711/133

(58) Field of Classification Search .................. 711/133, 711/135
See application file for complete search history.

(56) References Cited

U.S. PATENT DOCUMENTS

| 4,426,682 | A | * | 1/1984 | Riffe et al. | 711/135 |
| 4,733,348 | A | * | 3/1988 | Hiraoka et al. | 711/207 |
| 5,363,496 | A | * | 11/1994 | Kato et al. | 711/135 |
| 5,860,100 | A | * | 1/1999 | Feiste et al. | 711/135 |
| 5,893,149 | A | * | 4/1999 | Hagersten et al. | 711/135 |
| 7,000,078 | B1 | * | 2/2006 | Jones et al. | 711/141 |
| 7,055,003 | B2 | * | 5/2006 | Cargnoni et al. | 711/135 |
| 7,120,752 | B2 | * | 10/2006 | Wilson et al. | 711/135 |
| 2002/0087765 | A1 | * | 7/2002 | Kumar et al. | 710/107 |
| 2009/0070532 | A1 | | 3/2009 | Bussa et al. | |
| 2009/0210629 | A1 | * | 8/2009 | Blake et al. | 711/135 |

* cited by examiner

*Primary Examiner* — Matthew Bradley
*Assistant Examiner* — Glenn Gossage
(74) *Attorney, Agent, or Firm* — Cantor Colburn LLP; John Campbell

(57) ABSTRACT

User-controlled targeted cache purging includes receiving a request to perform an operation to purge data from a cache, the request including an index identifier identifying an index associated with the cache. The index specifies a portion of the cache to be purged. The user-controlled targeted cache purging also includes purging the data from the cache, and providing notification of successful completion of the operation.

17 Claims, 5 Drawing Sheets

USER-CONTROLLED TARGETED CACHE PURGE

BACKGROUND

Exemplary embodiments relate generally to cache storage systems, and more particularly to user-controlled targeted cache purge.

In order to test error injection for a given cache unit, a user needs to know what information currently resides in the cache. Typically, a user prefers to fill that space in the cache with specific information which can then be retrieved in order to see how the error injection has worked. In the past, to clear out a section of the cache, a selective purge could be sent along with an address range that would cover a whole index, clear out the whole cache or send in many fetches to that index so it fills up with known addresses. A purge refers to an operation that removes data from a cache, either because the data is bad or because the space in the cache is needed for other data.

As an index can have a range of hundreds if not thousands of different addresses, purging out based on address range can be very time consuming. Only a few addresses may be present in the cache so the castout engine must go through and do a look up for every address in the range to see if it needs to be cast out. In addition, purging out the whole cache can be very disruptive to the error injection test and prevents setting authentic test conditions. The drawback of sending in multiple fetches requires a fairly complex software set up procedure, takes longer to replace all the data, and does not guarantee that operations will not be replaced by other operations that might be occurring during those fetches.

BRIEF SUMMARY

An embodiment is a computer program product for implementing user-controlled targeted cache purging. The computer program product comprises a tangible storage medium readable by a processing circuit and storing instructions for execution by the processing circuit for performing a method. The method includes receiving a request to perform an operation to purge data from a cache, the request including an index identifier identifying an index associated with the cache. The index specifies a portion of the cache to be purged. The user-controlled targeted cache purging also includes purging the data from the cache, and providing notification of successful completion of the operation.

A further embodiment is a system for user-controlled targeted cache purging. The system includes a central processor and logic configured for execution on the central processor. The logic is configured to implement a method. The method includes receiving a request to perform an operation to purge data from a cache, the request including an index identifier identifying an index associated with the cache. The index specifies a portion of the cache to be purged. The user-controlled targeted cache purging also includes purging the data from the cache, and providing notification of successful completion of the operation.

A further embodiment is a computer-implemented method for user-controlled targeted cache purging. The method includes receiving a request to perform an operation to purge data from a cache, the request including an index identifier identifying an index associated with the cache. The index specifies a portion of the cache to be purged. The user-controlled targeted cache purging also includes purging the data from the cache, and providing notification of successful completion of the operation.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Exemplary embodiments provide a mechanism for providing user-controlled targeted cache purge operations. The targeted cache purge processes enable user-initiated purging of an entire index and/or a portion of an index, such as a specific cache slot. These processes provide a fast and efficient way to clear out a whole index in order to provide the user with control over what data is stored in a section of the cache corresponding to the index.

Figure 1:
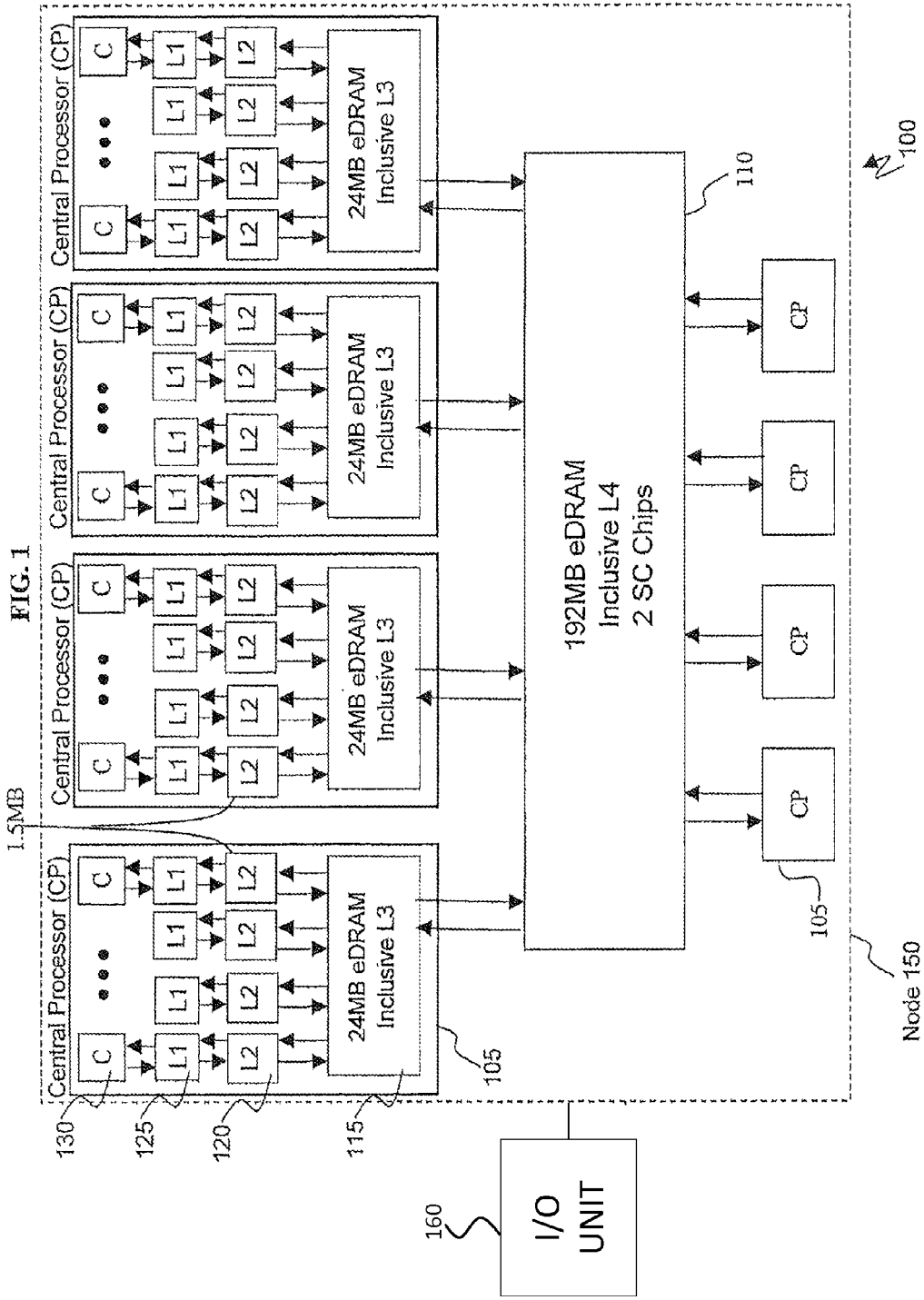
FIG. 1 depicts a system including a cache topology upon which targeted cache purge processes may be implemented in an exemplary embodiment.

Turning now to FIG. 1, a system 100 (including cache topology) for implementing the targeted cache purge processes will now be described in an exemplary embodiment. The system of FIG. 1 illustrates a plurality of central processors (CP) 105 (also referred to as central processing units or CPUs) operatively connected via busses to one or more L4 caches 110. Although not shown in FIG. 1, each of the central processors (CP) 105 includes one or more cores 130 which perform the reading and executing of instructions. On each central processor (CP) 105, the multiple cores 130 are operatively connected via busses to L1, L2, and L3 caches 125, 120, and 115. The L1 caches 125 are physically closest to the cores 130, followed by the L2 caches 120, and then the L3 caches 115. It is understood that the designation of caches could be reversed.

Figure 2:
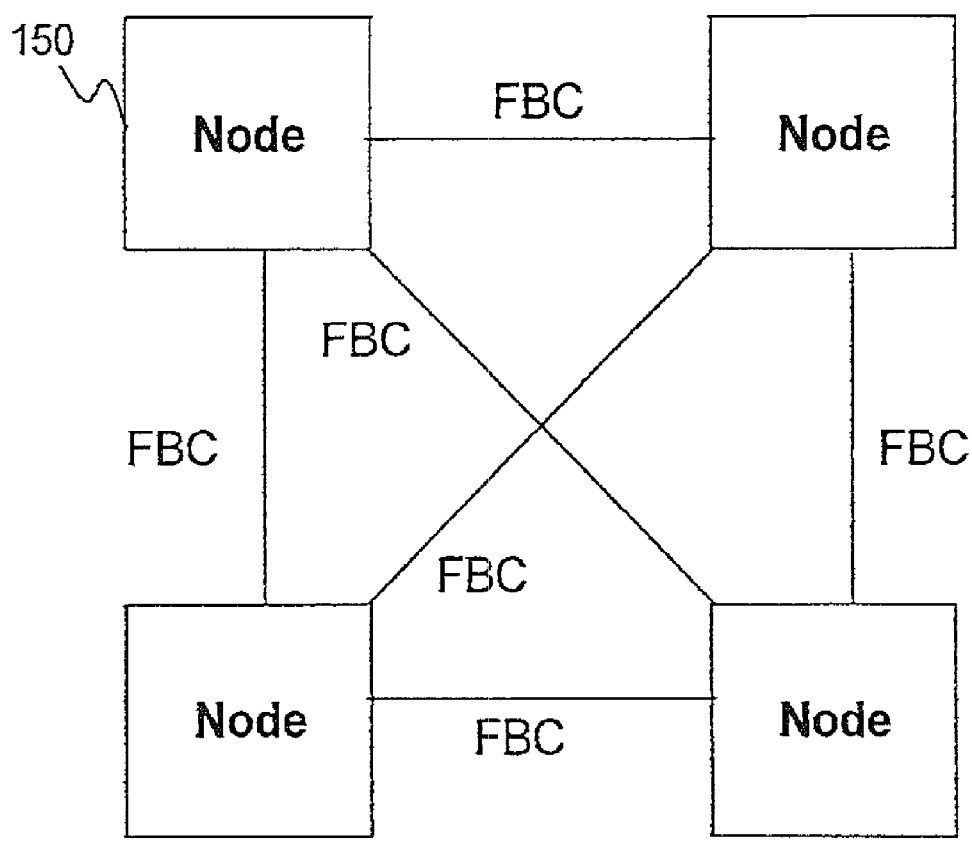
FIG. 2 depicts an example of a node-to-node fabric topology that may be used in implementing targeted cache purge processes in accordance with an exemplary embodiment.

Also shown in the system 100 is an L4 cache 110. The L4 cache 110 is operatively coupled to the CPs 105 and provides a shared memory space for each of the CPs 105. Although the L3 and L4 caches 115 and 110 are illustrated in FIG. 1 as embedded dynamic random access memory (DRAM), which is referred to as eDRAM, it will be understood by a skilled artisan that any other types of suitable memory may be utilized in realizing the exemplary embodiments. The central processors 105 operatively connected to one or more L4 caches 110 collectively form a node 150. In a computing system, multiple such nodes 150 may be operatively connected to one another for communicating, such as broadcasts, snooping, cache intervention, and responses. FIG. 2 illustrates an example of multiple nodes 150 operatively connected to one another via, e.g., one or more point-to-point buses or FBCs, referred to herein as a system fabric.

The system 100 is communicatively coupled to an input/output (I/O) unit 160. The I/O unit 160 may include, e.g., an I/O hub, adapters, and interface elements for performing various operations in connection with the central processors 105.

The system 100 further includes various components for implementing the targeted cache purge processes described herein. These various components are described further in FIG. 3.

Each individual central processor 105 is fabricated on its own separate chip, which includes the L1, L2, and L3 caches 125, 120, and 115, while the L4 cache 110 is fabricated on its own separate chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others.

Figure 3:
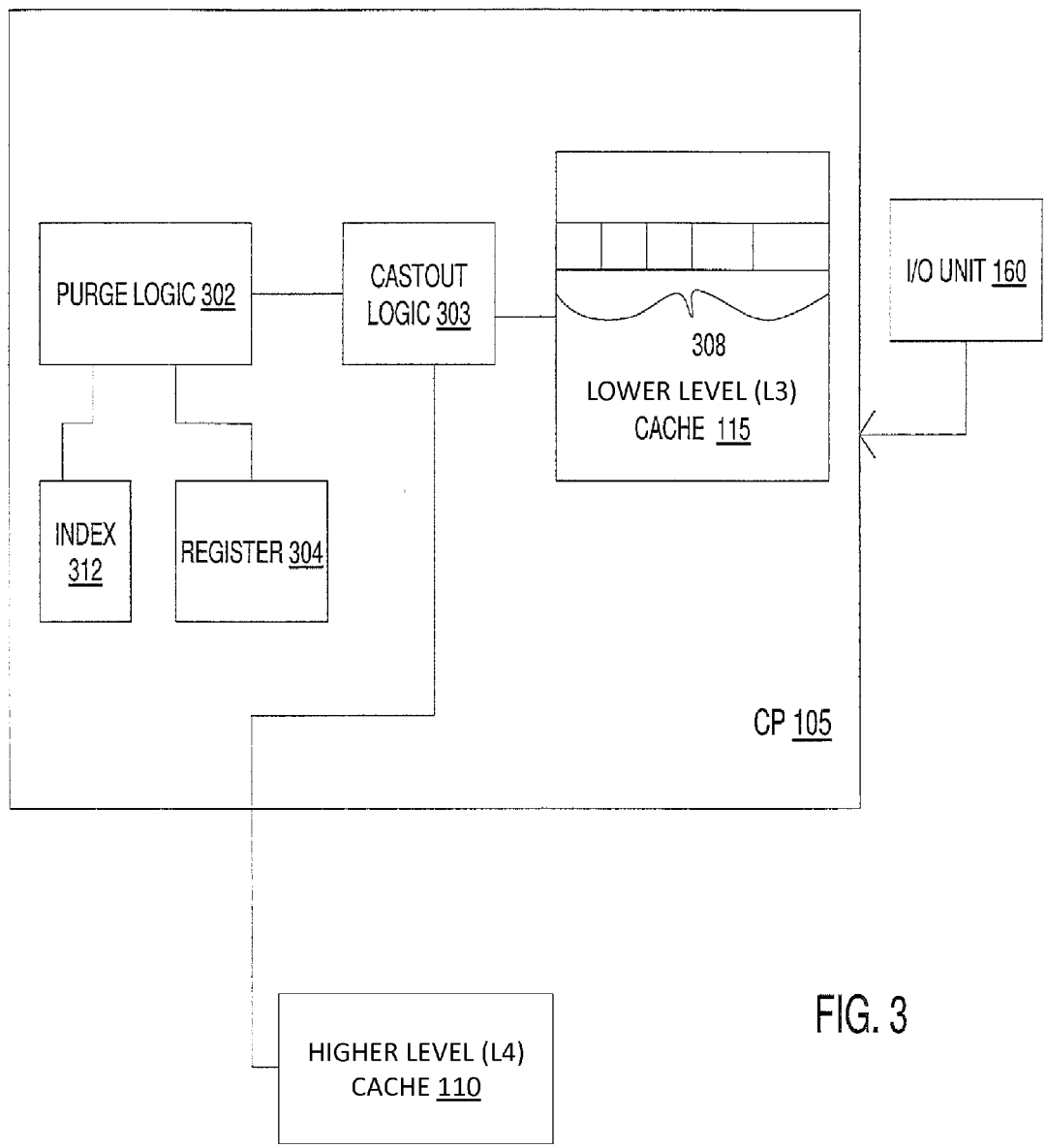
FIG. 3 depicts a detailed portion of the system of FIG. 1 upon which targeted cache purge processes be implemented in an exemplary embodiment.

Turning now to FIG. 3, a detailed portion of the system 100 of FIG. 1 will now be described in an exemplary embodiment. As shown in FIG. 3 each central processor 105 may include purge logic 302 in communication with an index 312 and a register 304. In addition the central processor 105 may include castout logic 303 in communication with the purge logic 302 and caches (e.g., lower level cache 115 and higher level cache 110). In an alternative embodiment, the logic 302/303, index 312, and register 304 may be implemented elsewhere in the system (e.g., in cache 110). The cache 115 includes cache slots 308 for which the error injection testing may be performed. A user may input commands or requests for implementing the exemplary targeted cache purge functions via, e.g., assembly code or software. A portion of the cache 115 associated with a particular index 312 may be selected for cache error injection as described further herein. The purge logic 302 and castout logic 303 are implemented by the central processor 105 for performing the exemplary targeted cache purge functions. The functionality of the index 312 and register 304 is described further in FIG. 4.

Figure 4:
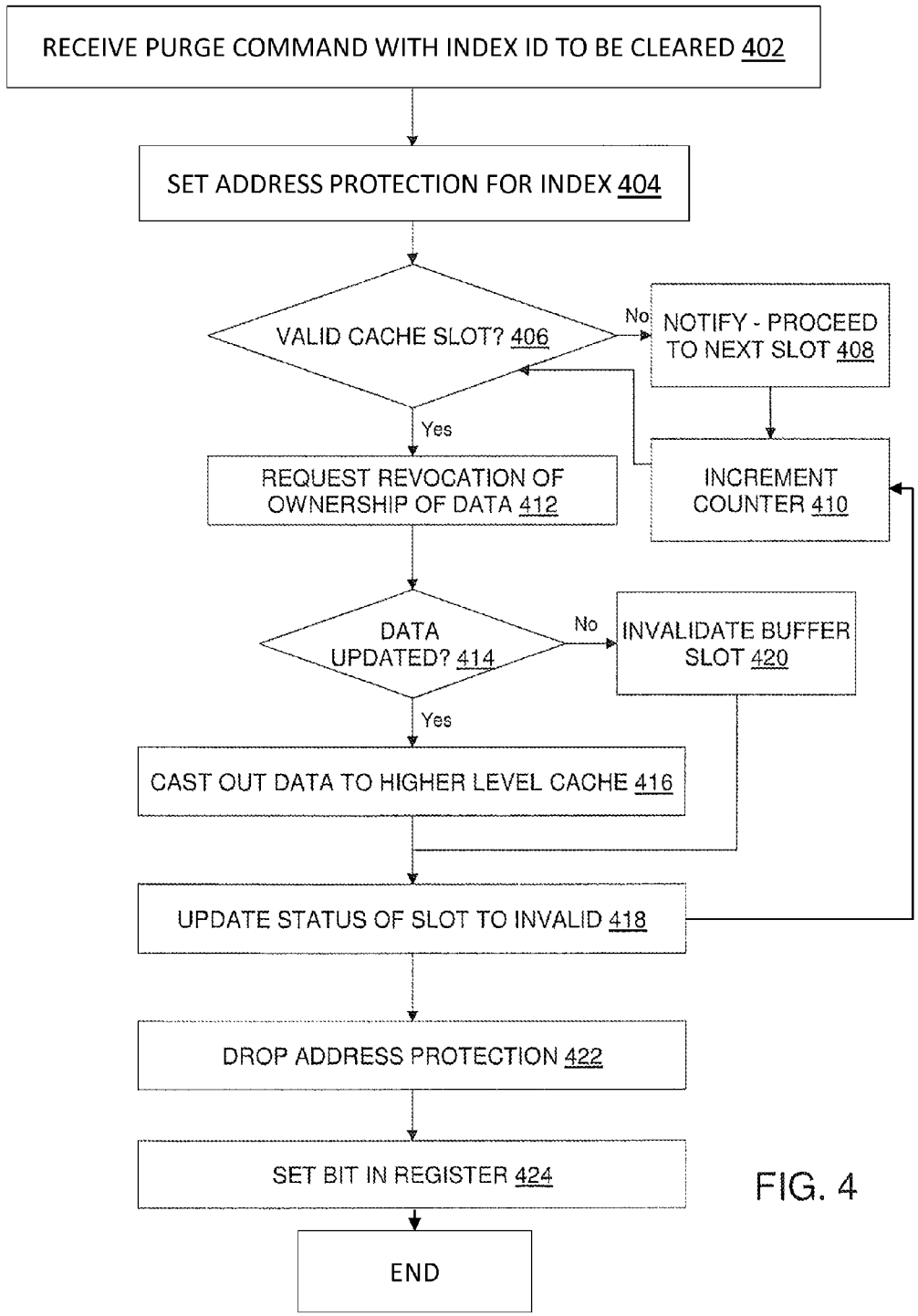
FIG. 4 is a flow diagram describing a process for implementing targeted cache purge processes in an exemplary embodiment.

Turning now to FIG. 4, an exemplary process for implementing targeted cache purge processes will now be described in an exemplary embodiment. For illustrative purposes, the process described in FIG. 4 uses inputs (purge commands) provided by a user, e.g., via assembly code or software (e.g., anything that is external to the cache logic, such as pins), via I/O unit 160 and an I/O cache slot (e.g., one or more of slots 308) under test. In addition, the processes described in FIG. 4 reflect a purging operation for an index that contains multiple cache slots. It will be understood, however, that a purging operation may be configured for implementation on a single targeted cache slot in an index, or even multiple cache slots in the index.

The purge logic 302 receives a purge command from a user, e.g., via I/O unit 160 at block 402. The purge command includes an index identifier for an index 312 targeted by the user for purging. As indicated above, the purge command may also include an indicator that only a portion of a cache is to be purged, e.g., a particular cache slot. However, for purposes of illustration, the processes described in FIG. 4 assume that multiple cache slots are identified for purge. Purge logic 302 sets an address protection for the index 312 at block 404. In response to a directive from the purge logic 302, the castout logic 303 checks the validity of the cache slot (e.g., slot 308) in the cache 115 targeted for purging at block 406. A cache slot may be considered to be valid if there is currently data in the cache slot. Likewise, a cache slot is considered to be invalid if no data resides in the cache slot.

If the cache slot is invalid, the castout logic 303 notifies purge logic 302 to examine the next cache slot in the index (if any) at block 408. The purge logic 302 increments a counter (not shown) to reflect this at block 410, and the process returns to block 406.

Returning to block 406, if the cache slot 308 is valid, the castout logic 303 sends a request to the lower level caches (e.g., cache 120, 125) for revocation of ownership of the data in the cache slot 308 at block 412. At block 414, it is determined whether the data in the cache slot 308 has been changed (updated) since it was installed in the particular cache. If the data has been changed (updated), the castout module logic 303 casts out the data from the cache slot 308 to a higher level cache (e.g., cache 110) once lower level caches (e.g., cache 120, 125) have rescinded ownership of the castout data at block 416. Once the castout data has been moved, the castout module logic 303 updates the status of the cache slot 308 in the index 312 as invalid at block 418, increments the counter at block 410, and the process returns to block 406.

Returning to block 414, if the data has not been changed (updated), this means that the data does not need to be moved to a higher level cache. In this instance, the castout module 303 invalidates the selected cache slot 308 at block 420. Once the data has been invalidated at block 420, the process proceeds to block 418, whereby the castout logic 303 updates the status of the cache slot 308 to invalid and the process returns to block 410.

Once all targeted cache slots in the index 312 have been handled via blocks 406 through 418, the address protection for the index 312 is dropped at block 422 and a user-monitored bit is set in the register 304 to reflect successful completion of the purge functions at step 424.

Technical effects of the exemplary embodiment provide user-controlled targeted cache purge operations that enable user-initiated purging of an entire index. These processes provide a fast and efficient way to clear out a whole index in order to provide the user with control over what data is stored in a section of the cache corresponding to the index.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the exemplary embodiments have been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 5:
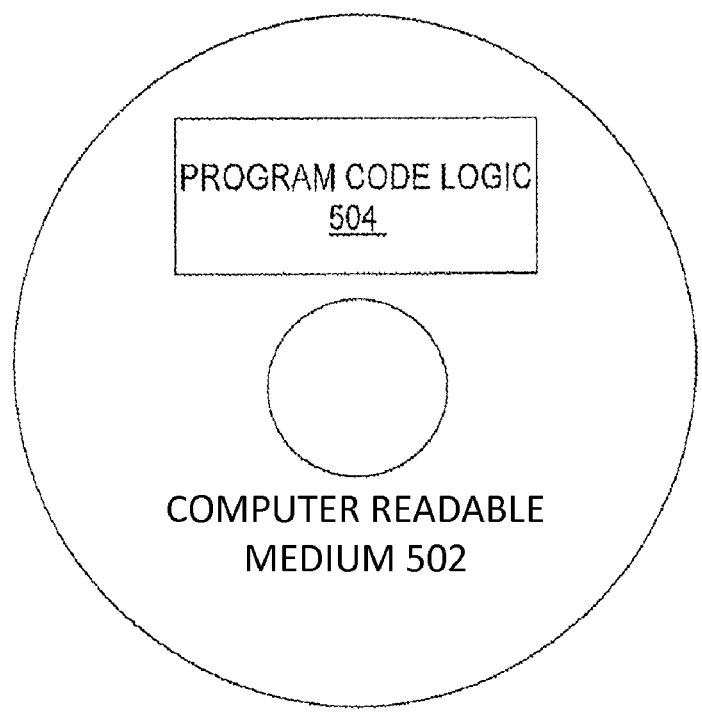
FIG. 5 is a computer program product in an exemplary embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product 500 embodied in one or more computer readable medium(s) 502 having computer readable program code 504 embodied thereon as shown in FIG. 5.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java®, Smalltalk®, C++® or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider or ISP).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

That is claimed is:

1. A computer program product for implementing user-controlled targeted cache purging, comprising a non-transitory tangible storage medium readable by a processing circuit and storing instructions for execution by the processing circuit for performing a method comprising:

receiving, by a computer processor, a request to perform an operation to purge data from a cache, the request including an index identifier identifying an index associated with the cache, the index specifying a portion of the cache to be purged;

purging the data from the cache; and
providing notification of successful completion of the operation,
wherein purging the data from the cache includes:
determining whether a cache slot is valid;
based on determining the cache slot is valid performing:
  revoking ownership of the data in the cache slot;
  determining whether the data in the cache slot has been updated; and
  based on determining the data in the cache slot has been updated, casting out the data in the cache slot to a level of cache further away from a central processor operatively associated with the processing circuit than a level of cache in which the cache slot is contained, updating a status of the cache slot to invalid, incrementing a counter and determining whether a next cache slot, if any, in the index is valid.

2. The computer program product of claim 1, wherein purging the data from the cache includes:
placing a protection on the index associated with the cache;
casting out the data from the cache; and
removing the protection placed on the index; and
setting a user-monitored bit in a register to reflect successful completion of the operation.

3. The computer program product of claim 1, wherein purging the data from the cache includes:
determining whether the cache slot is valid; and
incrementing a counter and determining whether a next cache slot in the index is valid, based on determining the cache slot is invalid.

4. The computer program product of claim 1, wherein purging the data from the cache includes:
determining whether the cache slot is valid;
based on determining that the cache slot is valid performing:
  revoking ownership of the data in the cache slot;
  determining whether the data in the cache slot has been updated; and
  invalidating the cache slot based on determining that the data in the cache slot has not been updated; and
  updating a status of the cache slot in the index as invalidated;
  incrementing a counter; and
  determining whether a next cache slot in the index is valid.

5. The computer program product of claim 1, wherein purging the data from the cache includes:
removing a protection placed on the index.

6. The computer program product of claim 1, wherein the request to perform the operation further comprises an identifier of a specific cache slot in the index subject to the operation.

7. A system for implementing user-controlled targeted cache purging, comprising:
a central processor; and
logic configured for execution on the central processor, the logic causing the processor to be operable for
  receiving a request to perform an operation to purge data from a cache, the request including an index identifier identifying an index associated with the cache, the index specifying a portion of the cache to be purged;
  purging the data from the cache; and
  providing notification of successful completion of the operation,
  wherein purging the data from the cache includes:
  determining whether a cache slot is valid;
  based on determining the cache slot is valid performing:
    revoking ownership of the data in the cache slot;
    determining whether the data in the cache slot has been updated; and
    based on determining the data in the cache slot has been updated, casting out the data in the cache slot to a level of cache further away from the central processor than a level of cache in which the cache slot is contained, updating a status of the cache slot to invalid, incrementing a counter and determining whether a next cache slot, if any, in the index is valid.

8. The system of claim 7, wherein purging the data from the cache includes:
placing a protection on the index associated with the cache;
casting out the data from the cache; and
removing the protection placed on the index;
the method further comprising setting a user-monitored bit in a register to reflect successful completion of the operation.

9. The system of claim 7, wherein purging the data from the cache includes:
determining whether the cache slot is valid; and
incrementing a counter and determining whether a next cache slot in the index is valid, based on determining the cache slot is invalid.

10. The system of claim 7, wherein purging the data from the cache includes:
determining whether the cache slot is valid;
based on determining the cache slot is valid:
  revoking ownership of the data in the cache slot;
  determining whether the data in the cache slot has been updated; and
  based on determining the data in the cache slot has not been updated, invalidating the cache slot; and
  updating a status of the cache slot in the index as invalidated;
  incrementing a counter; and
  determining whether a next cache slot, if any, in the index is valid.

11. The system of claim 7, wherein purging the data from the cache includes:
removing a protection placed on the index.

12. The system of claim 7, wherein the request to perform the operation further comprises an identifier of a specific cache slot in the index subject to the operation.

13. A computer-implemented method for implementing user-controlled targeted cache purging, the method comprising:
receiving, at a computer processor, a request to perform an operation to purge data from a cache, the request including an index identifier identifying an index associated with the cache, the index specifying a portion of the cache to be purged;
purging the data from the cache; and
providing notification of successful completion of the operation,
wherein purging the data from the cache includes:
determining whether a cache slot is valid;
based on determining the cache slot is valid performing:
  revoking ownership of the data in the cache slot;
  determining whether the data in the cache slot has been updated; and
  based on determining the data in the cache slot has been updated, casting out the data in the cache slot to a level of cache further away from a central processor than a level of cache in which the cache slot is contained, updating a status of the cache slot to invalid, incrementing a counter and determining whether a next cache slot, if any, in the index is valid.

14. The computer-implemented method of claim 13, wherein purging the data from the cache includes:
placing a protection on the index associated with the cache;
casting out the data from the cache;
removing the protection placed on the index; and
setting a user-monitored bit in a register to reflect successful completion of the operation.

15. The computer-implemented method of claim 13, wherein purging the data from the cache includes:
determining whether the cache slot is valid; and
upon determining the cache slot is invalid, incrementing a counter and determining whether a next cache slot in the index is valid, based on determining the cache slot is invalid.

16. The computer-implemented method of claim 13, wherein purging the data from the cache includes:
determining whether the cache slot is valid;
based on determining the cache slot is valid:
revoking ownership of the data in the cache slot;
determining whether the data in the cache slot has been updated; and
based on determining the data in the cache slot has not been updated, invalidating the cache slot; and
updating a status of the cache slot in the index as invalidated;
incrementing a counter; and
determining whether a next cache slot, if any, in the index is valid.

17. The computer-implemented method of claim 13, wherein purging the data from the cache includes:
removing a protection placed on the index.

\* \* \* \* \*